United States Patent [19]

Dunnihoo

[11] Patent Number: 5,708,819
[45] Date of Patent: Jan. 13, 1998

[54] PROCESS AND APPARATUS FOR GENERATING POWER MANAGEMENT EVENTS IN A COMPUTER SYSTEM

[75] Inventor: Jeffrey C. Dunnihoo, Austin, Tex.

[73] Assignee: Standard Microsystems Corporation, Hauppauge, N.Y.

[21] Appl. No.: 541,642

[22] Filed: Oct. 10, 1995

[51] Int. Cl.⁶ .................. G06F 1/32; G06F 9/00
[52] U.S. Cl. ............................... 395/750; 364/707
[58] Field of Search .............. 395/750; 364/707, 364/492; 307/38, 64, 126; 365/226, 229

[56] References Cited

U.S. PATENT DOCUMENTS

| | | | |
|---|---|---|---|
| 4,851,987 | 7/1989 | Day | 364/200 |
| 5,222,239 | 6/1993 | Rosch | 395/750 |
| 5,339,446 | 8/1994 | Yamasaki et al. | 395/750 |
| 5,369,771 | 11/1994 | Gettel | 395/750 |
| 5,386,552 | 1/1995 | Garney | 395/575 |
| 5,388,265 | 2/1995 | Volk | 395/750 |
| 5,410,713 | 4/1995 | White et al. | 395/750 |
| 5,481,299 | 1/1996 | Coffey et al. | 348/123 |
| 5,483,464 | 1/1996 | Song | 364/492 |
| 5,504,910 | 4/1996 | Wisor et al. | 395/750 |
| 5,521,854 | 5/1996 | Kadowaki et al. | 364/707 |
| 5,530,877 | 6/1996 | Hanaoka | 395/750 |
| 5,548,764 | 8/1996 | Duley et al. | 395/750 |
| 5,551,043 | 8/1996 | Crump et al. | 395/750 |

FOREIGN PATENT DOCUMENTS

| | | |
|---|---|---|
| 0008501 | 3/1980 | European Pat. Off. . |
| 0666525 | 8/1995 | European Pat. Off. . |
| 2132427 | 7/1984 | United Kingdom . |
| 2235797 | 3/1991 | United Kingdom . |

*Primary Examiner*—Gopal C. Ray
*Attorney, Agent, or Firm*—Hopgood, Calimafde, Kalil & Judlowe LLP

[57] ABSTRACT

A process and apparatus for reducing power consumption in processor-based system by interrupting the main system power supply during periods of inactivity. Existing input/output circuitry is powered from a constant auxiliary power source to monitor system interrupts which are used to generate power events that control the on/off state of the main system power supply.

11 Claims, 5 Drawing Sheets

PROCESS AND APPARATUS FOR GENERATING POWER MANAGEMENT EVENTS IN A COMPUTER SYSTEM

TECHNICAL FIELD

The present invention relates to a process and apparatus for reducing power consumption in computer systems. More particularly, the invention relates to a process and apparatus for monitoring and detecting various system events and turning the system power supply on or off in response to those events.

BACKGROUND OF THE INVENTION

Personal computers (PC's) have become very useful and popular since their introduction in the early 1980's. Portable laptop and notebook computers created the original demand for energy efficiency to allow for longer operating times between battery charges. Traditional approaches that have been implemented include the use of low-power CMOS integrated circuits, and liquid crystal displays (LCDs), and increased battery capacity. These approaches have, however, typically involved tradeoffs in functionality or size.

Computer equipment now accounts for at least five per cent of total electricity use. Power consumption, which was formerly an issue only in portable computers, is now a concern in all computers, and computer designers are finding it necessary to control previously unlimited power consumption.

One recent approach to power management is to power down a computer during periods of inactivity or to operate its components in the lowest power mode possible for the current state of operation. For example, a disk drive may be powered down when not in use or a processor, which is not currently executing a program, may be placed in various standby, snooze or suspend modes to reduce power consumption. This may be achieved by slowing the system clock, as described in U.S. Pat. No. 5,222,239, since it is well known that power consumption in a CMOS circuit is directly related to clock speed. However, in this approach the processor cannot be completely stopped during periods of inactivity since it would then be unable to detect when to resume operation.

In these systems, the designer must select "events" which will control power consumption. During normal operation, PC's often use "interrupt" events from input/output ("I/O") devices to initiate many functional processes. For example, keys are pressed on the keyboard, which causes an interrupt to the processor which invokes a keyboard handling routine. Many of today's computer systems use these interrupts to "wake" a system in a standby mode. However, these systems still consume significant power.

Systems which completely power-down the processor require some intelligent control, that is, some battery powered or auxiliary power-supplied circuitry to "watch" the power button or monitor other power-on events and generate the signals to power-up the rest of the system. A common implementation of this technique is to incorporate power management control in a dedicated microcontroller, a computer within a computer, to act as a watchdog for the entire system. This controller watches I/O activity and interprets certain activity as a power event. This dedicated controller and its associated circuitry remain active, consuming power, albeit less than the fully-powered system, even when the computer system is powered down. For example, U.S. Pat. No. 5,339,446 proposes the use of a microcomputer within an intelligent power supply to shut down power to a computer system in response to a switch request or a low-battery condition. Power is restored to the computer system upon charging the battery or pressing the power switch again.

U.S. Pat. No. 5,369,771 presents another computer system having power management control features which control system clock speed or operation based on I/O activity using a discrete power management microcontroller.

U.S. Pat. No. 5,386,552 presents a process for saving the state of a computer system upon the occurrence of a triggering event such as closing the lid of a laptop, expiration of an inactivity timer, or low battery condition, and restoring this state upon the occurrence of a resume operation event such as pressing a button, opening the lid of a laptop, pressing a key on a keyboard, or activating a mouse or other input device. Once the state is saved, a low-power mode is entered until the resume event is received.

The disadvantage of these systems is that they either leave the processor active, which consumes substantial power, or they use a dedicated microcontroller to provide the necessary power event control and management. Included in this problem is the extra hardware cost, extra software development cost, extra system board space required, and the inherent complexity of designing a computer within a computer. Additionally, most prior art implementations turn the I/O controller completely off, and some go to great lengths to save the configuration/run state of those devices for restoration when power is reapplied. This restoration is complex, time consuming and not always completely successful.

SUMMARY OF THE INVENTION

It is accordingly an object of the invention to reduce the power consumption of a processor-based system by interrupting power thereto during selected periods of inactivity.

It is another object of the invention to provide an apparatus to reduce power consumption in a processor-based system in which no additional microcontroller is required.

A further object of the invention is to provide a process and apparatus to reduce the power consumption of a processor-based system by adding a minimal amount of logic and circuitry to the processor-based system.

To achieve these objectives, the present invention incorporates a power supply, having an on state and an off state, for conveying power from a power source to a processor-based system. A latching device is provided having an output signal which alternates between two logic states, corresponding to the on and off states of the power supply. The state of the latch is toggled on the occurrence of a power management interrupt which is generated upon the detection of existing I/O events in the processor-based system.

I/O devices typically notify the computer processor of a status change by generating an interrupt request ("IRQ"). In accordance with one aspect of the invention, these status interrupts are the basis of power-management events. In the normal run state of the computer system, these status interrupts can directly initiate power-down routines in the computer processor. For example, the detection of the operation of a power button will initiate an interrupt handler routine in the processor that generates the power management interrupt. This occurrence of the power management interrupt places the latching device in a logical state which turns the power supply off.

In another aspect of the invention, the existing I/O devices in the computer system are powered by an auxiliary power supply. Leaving these I/O devices in their normal run state while the rest of the system is powered down ensures that their status interrupts are still available to be monitored as the basis of power-management events, eliminating the need for a separate microcontroller. For example, an interrupt from a keyboard controller indicating a new keystroke on a keyboard can be used as a power-up event. This occurrence of selected status interrupts generates the power management interrupt, switching the latching device to its alternate logic state which turns the power supply back on.

BRIEF DESCRIPTION OF THE DRAWINGS

The present invention will be further described in connection with the accompanying drawings, in which.

DETAILED DESCRIPTION OF THE PREFERRED EMBODIMENTS

Figure 1:
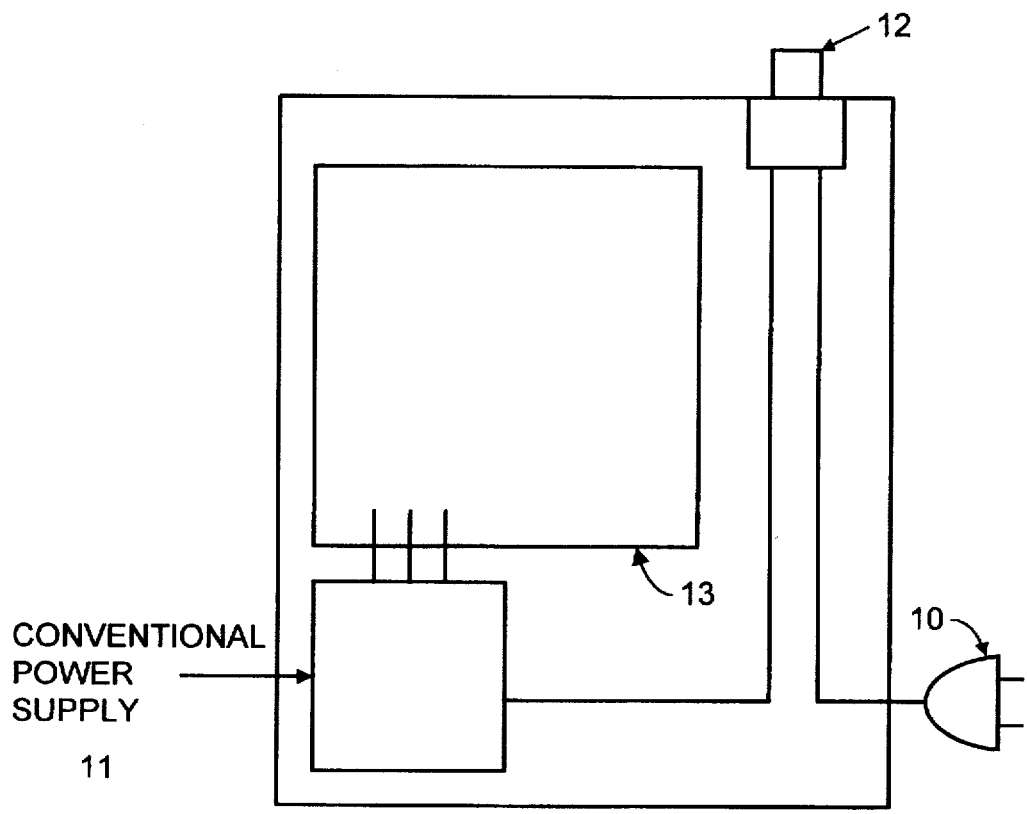
FIG. 1 is an illustration of a conventional power management system.

A conventional power system, as shown in FIG. 1, includes an AC plug 10 connected in series with AC switch 12 leading to a conventional power supply 11. The AC switch 12 has on and off positions in which the user manually disables AC power to the computer system 13 when not in use.

Figure 2:
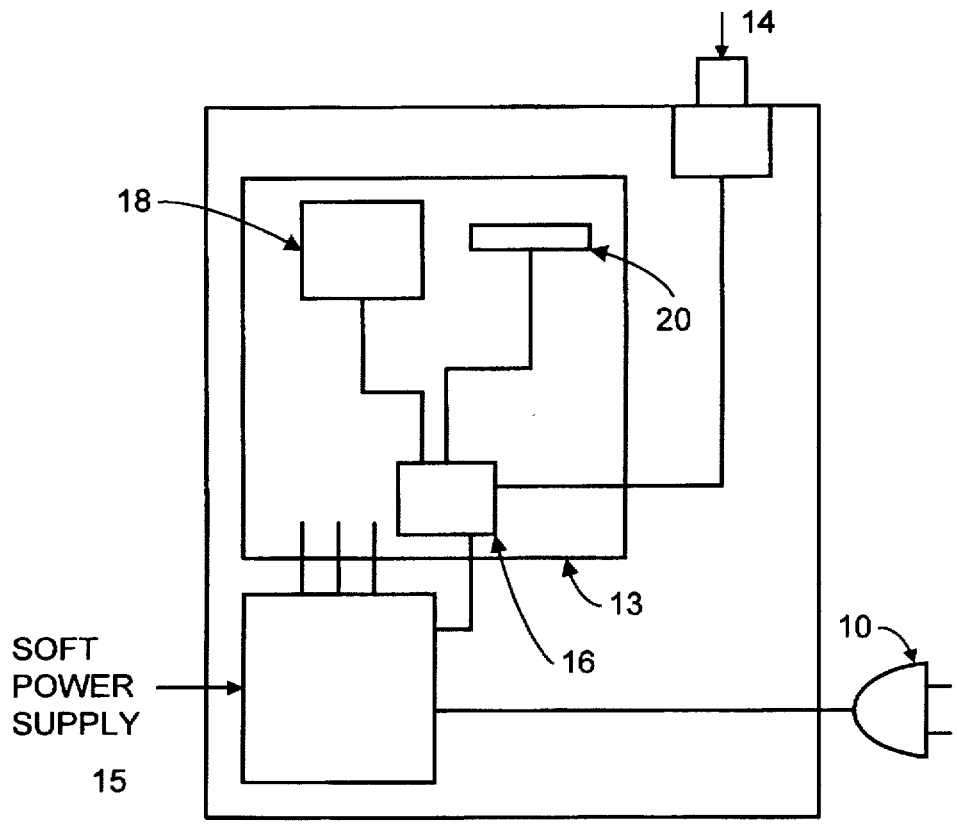
FIG. 2 is an illustration of a typical "soft" power management system.

In a conventional "soft" power system, shown in FIG. 2, AC power from power plug 10 is delivered directly to a "soft" power supply 15. A "soft" power supply is a power supply which is controlled by a digital signal rather than a hardwired switch. A momentary power push button 14 is connected to a power management microcontroller 16 which also monitors an I/O controller chip 18 and a clock chip 20. In response to inputs from chips 18 and 20 and button 14, microcontroller 16 controls the state of the soft power supply 15. In this technique, the user does not directly control the on and off state of the computer system 13 - - - pressing the power button 14 simply initiates a power event request to the microcontroller 16.

The present invention uses such a soft power supply and generates all the "power events" necessary to form a complete power management scheme.

Although not a necessary component of the invention, the power management technique of the present invention is facilitated by the use of currently available advanced I/O controllers, such as the FDC 37C93X series manufactured by Standard Microsystems Corporation of Hauppauge, N.Y. These controllers incorporate, in a single chip, all the I/O requirements of a typical computer system including a keyboard interface, real time clock ("RTC"), floppy disk controller, digital data separator, universal asynchronous receiver-transmitter ("UART"), parallel port, integrated drive electronics ("IDE") interface, and programmable general purpose I/O ("GPIO") ports. Through internal configuration registers, each of these internal device's IRQ channel is programmable by a host processor. For example, an interrupt from the keyboard controller can be programmed to use IRQ1, or any other available channel. Power to each of these internal devices may also be individually controlled. That is, the host processor may write a command to an internal power control register of the I/O controller so that, when not needed, the clock signal to individual component blocks of the I/O controller will be stopped. For example, the floppy disk interface within the I/O controller may be disabled when the computer is idle, and enabled again when needed.

Figure 3:
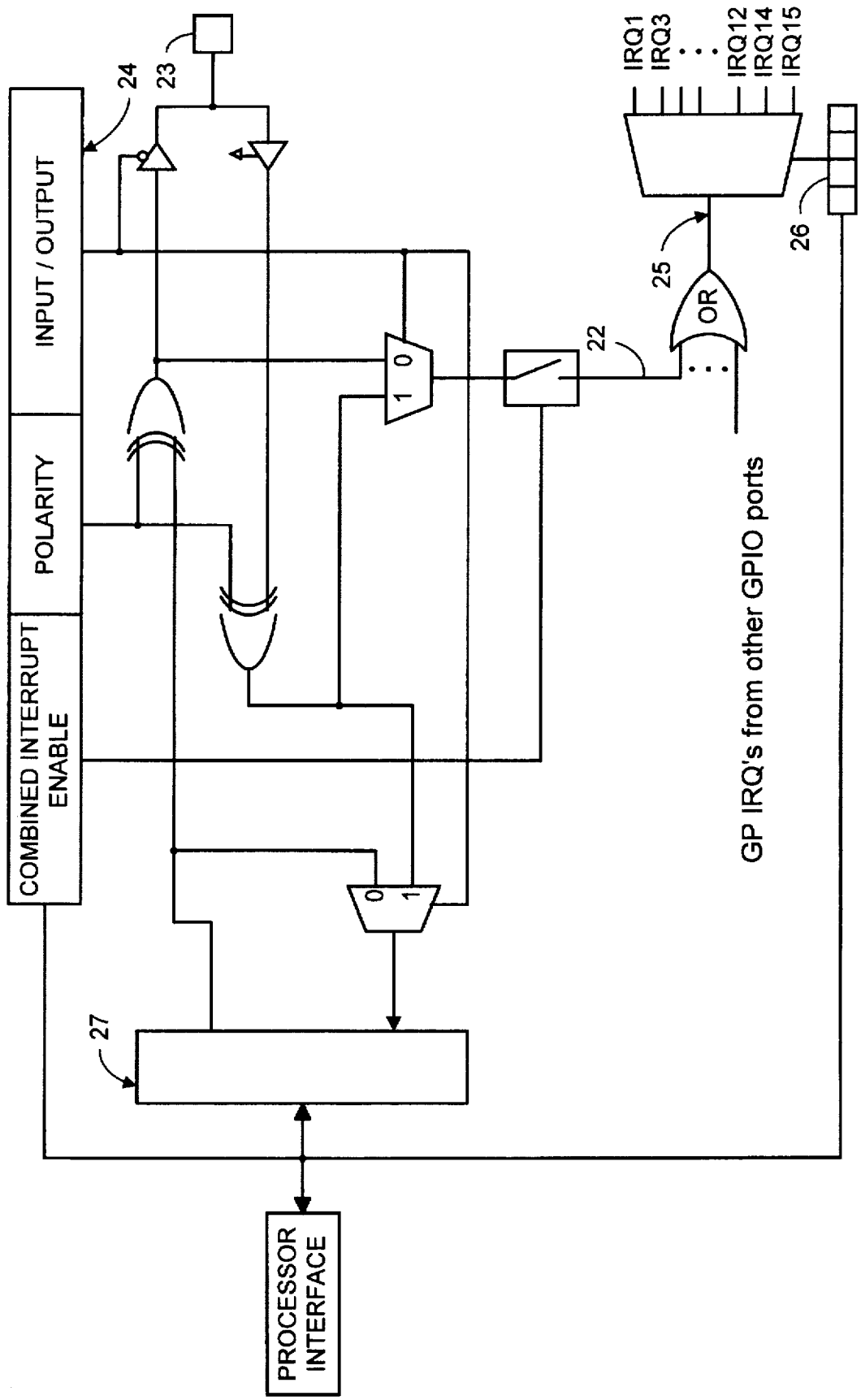
FIG. 3 is a block diagram illustrating the structure of a general purpose I/O port of an advanced I/O controller.

Another useful feature of the advanced I/O controller is the flexibility provided to the system designer through a set of individually programmable GPIO ports. FIG. 3 shows the structure of each of these ports. Each GPIO port 23 has a processor-accessible Configuration Register 24 whose individual bits designate whether the associated port is configured as an input or output, and inverting or non-inverting. In addition, the Configuration Register may be programmed to enable each port signal to feed to a general purpose interrupt request ("GP IRQ") 22. A combined interrupt request 25 is generated internally from the ORed function of the GP IRQ's of all interrupt enabled GPIO ports and steered to an external IRQ channel. The external IRQ channel (i.e., IRQ1, IRQ3-IRQ12, IRQ14-15) used for this combined interrupt is selected by another processor-accessible Configuration Register 26. In short, an interrupt from any internal logical block or a signal from any GPIO port may be directed, under processor control, to any IRQ channel desired.

Using the capabilities of these controllers, new power management features can be introduced without the significant cost of a dedicated microcontroller. A PC could turn on simply by typing on the keyboard or moving the mouse; even infra-red signals could turn on the machine (like a TV remote). The GPIO ports on these I/O controllers are host processor accessible and can be configured so that multiple switches and analog inputs could easily be added as power-management events. Any existing event that the I/O controller handles could be used as a power management event under host processor control. In this way, a very flexible power-management system can be designed without the need for a separate microcontroller, while only the existing I/O controller needs to remain powered to monitor the system for power-up "events." The rest of the system, including the processor, can be powered down to conserve energy. Moreover, leaving the I/O controller powered eliminates the need to save and restore the run state of these devices as often done in prior art systems. The configuration registers of the I/O controller will remain powered at all times, and the internal logical blocks also remain powered, thus saving their run state. As previously mentioned, the clock to individual blocks can be stopped, placing these CMOS subcircuits in a low-power consuming state.

Figure 4:
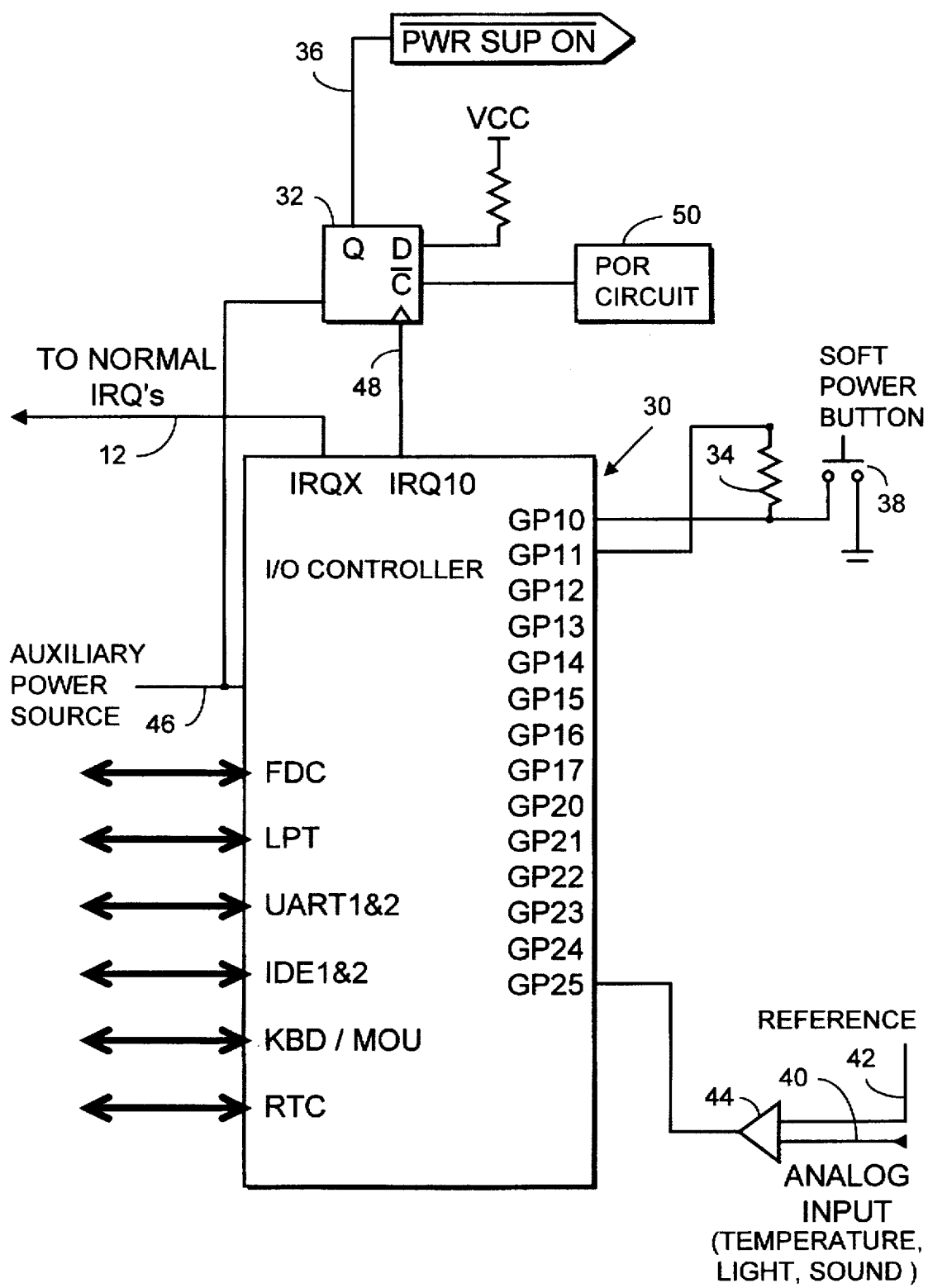
FIG. 4 is a block diagram of a power management system in accordance with an embodiment of the present invention.

With reference to FIG. 4, an embodiment of the present invention is shown. In addition to the above-described I/O controller 30, the only hardware requirement of this embodiment is a flip flop 32. I/O controller 30 and flip flop 32 are powered from an auxiliary power source 46 which is always available even when "soft" power to the rest of the computer system is off. This auxiliary power source may be generated by the main power supply or by a separate source, such as a battery. An unused IRQ channel output of I/O controller 30 (IRQ10 in the example) is dedicated as a power management interrupt 48 and is connected to the clock input of flip flop 32. The Q output of flip flop 32 generates the digital signal 36 (PWR SUP ON/) used to control the soft power supply.

In operation, a host processor can be programmed to perform the following events to initiate a power-saving mode. To initialize the system, when a computer system employing the present invention receives AC power for the first time (i.e., plugged into a wall outlet), a Power-On-Reset ("POR") circuit 50 forces the Q output of flip flop 32 to a "0", turning on the soft power supply for some time period. The host processor boots up and may then program the system as desired, but should at least configure one GPIO port (e.g., GP10) as an input to monitor the power button 38. Referring again to FIG. 3, this can be accomplished by the host processor programming bit-0 of the GPIO Configuration Register 24 in GP10 to be an input and bit-2 to enable the Combined Interrupt Enable. The processor should also program IRQ Channel Configuration Register 26 to contain the binary code for IRQ10 (the dedicated power management interrupt). Then, if power button 38 (FIG. 4) is pressed, the input of GP10 is grounded. Since the Combined Interrupt Enable bit in GP10 is set, the signal on GP10 is steered to GP IRQ 22, which generates the combined interrupt request 25, which in turn is steered to external IRQ channel IRQ10 (48, in FIG. 4). After this initialization, the host processor issues the commands necessary to power down unneeded blocks of the I/O controller 30 (e.g., disk interfaces, parallel port) then turns off the soft power supply. In this manner, at least the power button 38 will be established as a power-on "event" when a computer is first plugged in. Now, when the user presses power button 38, the dedicated power management interrupt 48 is generated. This interrupt clocks flip flop 32, currently having a "0" on its D input (i.e., system power is off). This sets the Q output to "0", turning the soft power supply on.

When the computer system is fully-powered and active in its normal state, the main configuration register of the I/O controller (not shown) has the IRQ channels of its logical blocks mapped to their normal locations (e.g., keyboard= IRQ1; floppy=IRQ6; RTC=IRQS, etc.). In this state, input GP10 is not steered to the dedicated power management interrupt 48, but to an unused interrupt channel (typically IRQ15) or an equivalent processor attention-request signal. When the system receives a power-down event, such as the user pressing the soft power button 38, the ensuing interrupt (e.g., IRQ15) causes the host processor to initiate a power-down routine including powering down all unneeded logical blocks within the I/O controller 30 (the floppy disk interface, for example) by writing to the power control register of the I/O controller (also not shown). All blocks which will not be used to monitor power-up events may be powered-down. For all those logical blocks which are to remain active in the I/O controller, including the GPIO ports used to monitor switches, the processor must reprogram the IRQ channel of each of these blocks to the IRQ channel established as the dedicated power management interrupt 48 (IRQ10 in the example). The host processor then issues a power-down command. This may be performed in the current embodiment by writing a 0, followed by a 1, to the bit of the GPIO register 27 (FIG. 3) associated with GPIO port GP11. This processor-accessible register has one bit for each GPIO port, each bit reflecting the state of the port. (GP11 must have been configured as an output by programming bit-0 of GPIO Configuration Register 24 associated with GP11). This signal transition is passed to output GP11. Referring again to FIG. 4, GP11 momentarily pulls down, through resistor 34, the voltage on input GP10 to ground. GP10, having been set up as one of the I/O blocks to remain active, now has its input signal steered to the dedicated power management interrupt 48. Thus, the power-down command originally written by the processor appears as a pulse on line 48 which toggles flip flop 32. This sets the Q output of flip flop 32 to a "1" since there was a "1" on the D input of flip flop 32 (i.e., system power was on). This "1" voltage on the PWR SUP ON/ line 36, when connected to a soft power supply, signals the power supply to turn off. Thus, a power savings state is entered as all system components are powered-down with the exception of the I/O controller 30 and flip flop 32 which are powered from the auxiliary power source 46. Moreover, several of the more power consuming blocks (e.g., the floppy, parallel port and IDE blocks) of the I/O controller were powered down. These blocks can be powered down, as the floppy drive, hard drive and printer are not likely to create power-up events.

Other "events" which may trigger a power-down event are, for example, monitoring an analog input for a particular value, or the expiration of an inactivity timer. Still referring to FIG. 4, an analog input 40 can be compared to a reference value 42 in comparator 44. When the values compare favorably, a signal is input to a GPIO port (e.g., GP25) which is configured as an input. GP25 is programmed, during normal operation, to generate an interrupt or other request signal to the host processor which will initiate an interrupt handler routine similar to the IRQ15 power-down routine described above. Examples of suitable analog "events" are: temperature, to power-down or start extra fan systems in an overheating computer; light, room lighting could actively control PC power; and sound, a microphone could sleep or wake the machine (like the infamous hand-clapping light controller).

The system now sits in this power saving state until one of the programmed power-up events occurs. This can be, again, the momentary pressing of soft power button 38. Other power-up events will be described later. This action pulls the voltage on GP10 to ground momentarily. GPIO port GP10, still configured as an input steered to IRQ10 (the dedicated power management interrupt 48), passes this pulse to the clock input of flip flop 32. Since system power is off, the D input to flip flop 32 is "0", and the Q output thereof is set to "0" turning the system power supply back on. The host processor powers up, then reconfigures the IRQ channels of the blocks in the I/O controller to their normal configuration from before power-down.

Of great advantage is the flexibility offered in ways to power-up the system. Virtually any event can be used for this function without adding system hardware since the I/O controller remains active. Thus, any UART activity, including ring indicator, can be used as a power event. Any keyboard or mouse activity, an RTC alarm, an interrupt from a parallel port, an analog alarm or any other interrupt can be a power event. Any button, such as the soft-power button described above, can be monitored via a GPIO port as a power event as well. In each case, the interrupt generated by the desired event(s) is steered to the dedicated power management interrupt 48 (e.g., IRQ10) before the system is powered down. When that event occurs, power management interrupt 48 is generated which toggles the flip flop 32, and, in turn, turns on the soft power supply. In this embodiment, only the flip flop and I/O controller consume power in the power-saving mode, and the I/O controller is partially powered-down internally so that it consumes minimal power.

Figure 5:
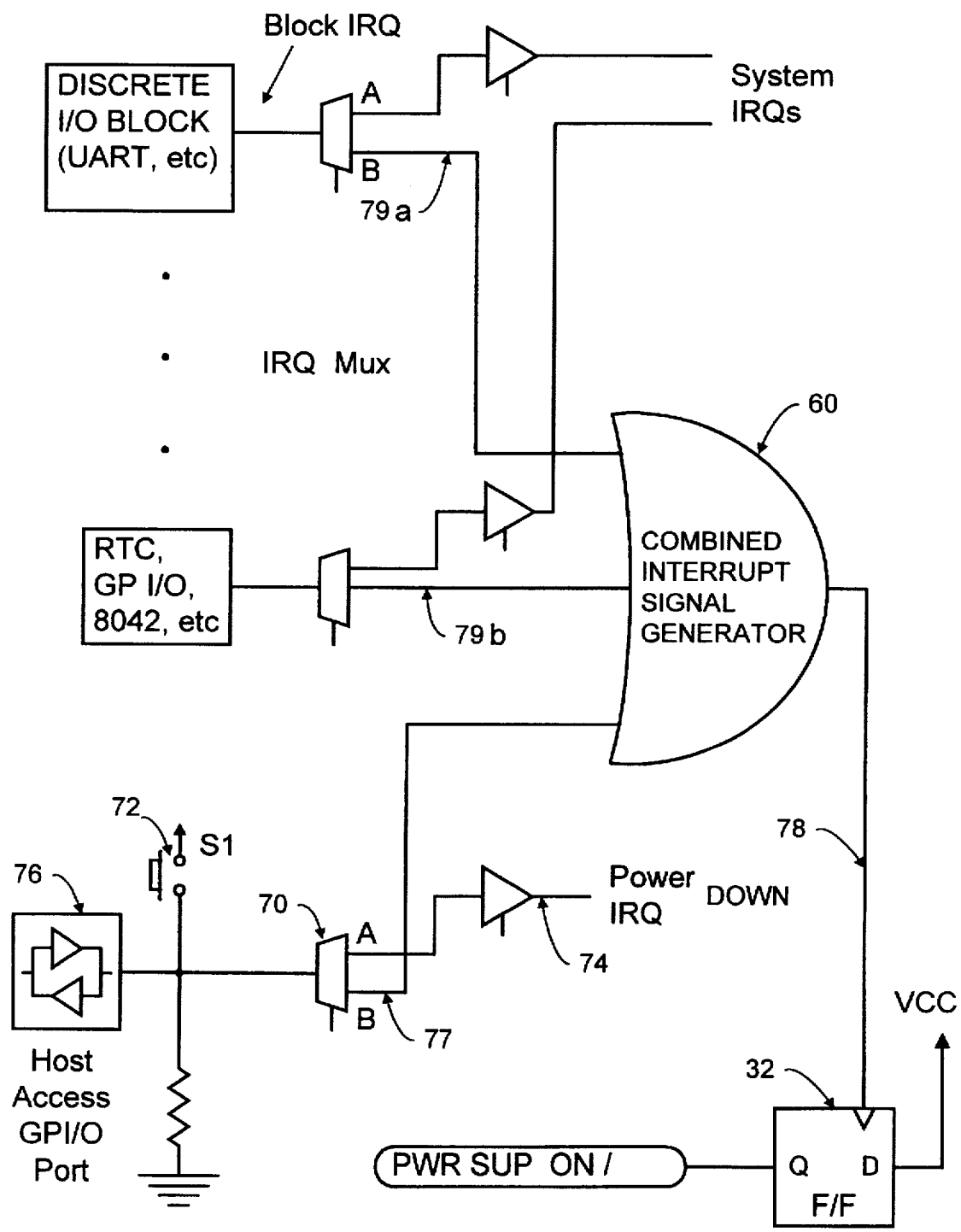
FIG. 5 is a block diagram of an alternative embodiment of the present invention using discrete blocks for all I/O functions.

The present invention is also applicable in a system which does not use the described advanced I/O controller. FIG. 5 shows an alternate embodiment of the invention in which discrete blocks perform the logical functions for each I/O device. The I/O devices generate block "interrupts" which may be monitored to generate power events. In this embodiment some additional circuitry is required which must also be powered from an auxiliary power source even when the system is generally powered down. However, this embodiment still makes use of the present invention to avoid the necessity and complexity of a dedicated power microcontroller and also avoids the necessity of saving and restoring the run state of the I/O devices.

Referring to FIG. 5, the block IRQ from each of the discrete I/O devices is input to a multiplexer which routes the interrupt either to its normal system destination (i.e., the host processor) when in the "A" position or to a combined interrupt signal generator 60 when set to the "B" position. Appropriate accommodations must be made to enable the IRQ multiplexers such as programming them via the host processor. These steps will be apparent to one skilled in the art.

The combined interrupt signal generator 60 may be formed from a multi-input OR gate whose output is connected to the clock input of flip flop 32. The Q output of the flip flop is PWR SUP ON/ and operates a soft power supply for the computer system as described in the previous embodiment.

With the system operating in the normal run state, the IRQ multiplexers are set to position "A" (i.e., programmed to route the block IRQ's to their normal system destinations). Multiplexer 70 is provided to generate a power-down event. When a power-down request is made (e.g., power switch S1, 72, is pressed), a power-down IRQ 74 is generated which initiates an interrupt handler routine in the host processor (not shown). The interrupt handler determines if the system can be safely powered down, then sets the multiplexers for those I/O blocks which will be used to monitor power-up events to the "B" position. The host processor then powers down the system by writing to a general purpose port 76 also connected to multiplexer 70. Multiplexer 70, now set to the "B" position, receives the power-down command through port 76, generates a power event 77, and in turn, a combined interrupt signal 78 which toggles flip flop 32 as in the previous embodiment, turning the system power supply off. The I/O blocks, multiplexers, combined interrupt signal generator 60, and flip flop 32 remain powered from the auxiliary power source.

When in this power-saving state, if any block being monitored for a power-up event (i.e., associated multiplexer set to "B" position) generates an interrupt, such as a UART IRQ, an RTC alarm IRQ, or power switch S1, the block interrupt generates a power event (one of 77, 79a, 79b, etc.) any of which generates a combined interrupt signal 78. This, in turn, clocks flip flop 32. As in the previous embodiment, the D input of flip flop 32 is "0" since system power is off. When the flip flop receives the clocking signal on line 78, the Q output is set to 0, turning the system power supply back on.

The host processor then powers up again, sets the multiplexers back to their "A" positions, handles the pending IRQ if necessary and resumes normal operation.

The present invention relies almost entirely on host processor software control and therefore incurs almost no extra hardware costs. This invention requires only that the existing I/O controller or other interrupt generating logic remain powered and have any change in interrupt status generate a power event to power up the rest of the computer system.

It will be recognized by those skilled in the art that many implementations and modifications of the described embodiments are possible without departing from the scope of the invention. Accordingly, it should be understood that the embodiments suggested herein are merely illustrative of the inventive concepts. For example, numerous system events or combinations thereof may be substituted for those power events described herein. Various system features may be enabled and/or disabled rather than power up/down using the concepts contained herein. Likewise, a wide variety of hardware implementations may be substituted for the combined interrupt generator and flip flop used to toggle the state of the power supply.

What is claimed is:

1. An apparatus for reducing power consumption in a processor-based system, said apparatus comprising:

means for monitoring a processor-selected plurality of input/output events occurring in said processor-based system and for generating a dedicated power interrupt in response to the occurrence of any of said events;

static logic state means for receiving said dedicated power interrupt and generating an output signal which alternates between a first logic state and a second logic state in response to each occurrence of said dedicated power interrupt; and a power supply for connection to a power source and having an on state and an off state, said power supply including means for conveying power from said power source to said processor-based system when said power supply is in said on state and interrupting said power to said processor-based system when said power supply is in said off state, and means, responsive to said output signal, for placing said power supply in said on state when said output signal is in said first logic state and in said off state when said output signal is in said second logic state.

2. The apparatus of claim 1, wherein said power supply further includes means for conveying power from said power source to said monitoring means and said static logic state means at all times.

3. The apparatus of claim 1, wherein said monitoring means and said static logic state means are powered from an auxiliary power source.

4. The apparatus of claim 1, wherein said static logic state means further comprises reset means for placing said output signal in said first logic state upon initial connection of said power supply to said power source.

5. The apparatus of claim 1 wherein said static logic state means comprises a flip flop.

6. An apparatus for reducing power consumption in a processor-based system, said apparatus comprising:

means for monitoring a processor-selected input/output function of said processor-based system and for generating a block interrupt in response to the occurrence of said function;

interrupt steering means having a first input for receiving said block interrupt, a second input for receiving a control signal, a first output for generating a system interrupt to said processor-based system and a second output for generating a power event signal, the system interrupt being generated upon receipt of said block interrupt when the control signal is in a first control state and said power event signal being generated upon receipt of said block interrupt when the control signal is in a second control state;

static logic state means, responsive to said power event signal, for generating an output signal which alternates between a first logic state and a second logic state in response to each occurrence of said power event signal; and a power supply for connection to a power source and having an on state and an off state, said power supply including means for conveying power from said power source to said processor-based system when said power supply is in said on state and interrupting said power to said processor-based system when said power supply is in said off state, and means, responsive to said output signal, for placing said power supply in said on state when said output signal is in said first logic state and in said off state when said output signal is in said second logic state.

7. The apparatus of claim 6, wherein said power supply further includes means for conveying power from said power source to said monitoring means, said interrupt steering means and said static logic state means at all times.

8. The apparatus of claim 6, wherein said monitoring means, said interrupt steering means and said static logic state means are powered from an auxiliary power source.

9. The apparatus of claim 6, wherein said control signal is generated by the processor within said processor-based system.

10. The apparatus of claim 6 wherein said interrupt steering means comprises a multiplexer.

11. The apparatus of claim 6 wherein said static logic state means comprises a flip flop.

* * * * *